(12) United States Patent
Nudelman et al.

(10) Patent No.: US 11,060,515 B1
(45) Date of Patent: Jul. 13, 2021

(54) OIL-WATER SEPARATOR SYSTEM FOR VACUUM PUMPS AND METHOD EMPLOYING SAME

(71) Applicant: Eagletree-Pump Acquisition Corp., New York, NY (US)

(72) Inventors: Aleksey Nudelman, Cliffside Park, NJ (US); Raphael Sagher, Alpine, NJ (US); Kevin Matthew Vroman, Freehold, NJ (US); Thomas Latsos, Franklin Lakes, NJ (US)

(73) Assignee: Airtech Group, Inc., Rutherford, NJ (US)

( * ) Notice: Subject to any disclaimer, the term of this patent is extended or adjusted under 35 U.S.C. 154(b) by 0 days.

(21) Appl. No.: 16/351,676

(22) Filed: Mar. 13, 2019

(51) Int. Cl.
| | |
|---|---|
| *F04B 37/14* | (2006.01) |
| *B01D 17/12* | (2006.01) |
| *B01D 17/02* | (2006.01) |
| *A01G 23/10* | (2006.01) |
| *B01D 35/30* | (2006.01) |
| *B01D 17/00* | (2006.01) |

(52) U.S. Cl.
CPC .............. *F04B 37/14* (2013.01); *A01G 23/10* (2013.01); *B01D 17/02* (2013.01); *B01D 17/10* (2013.01); *B01D 17/12* (2013.01); *B01D 35/30* (2013.01)

(58) Field of Classification Search
CPC .......... F04B 37/14; F04B 15/02; F04B 37/10; F04B 39/02; F04B 53/18; B01D 17/02; B01D 17/12; B01D 17/10; B01D 11/04; B01D 11/0446; B01D 11/0488; B01D 11/0492; B01D 17/0208; B01D 17/0214; B01D 21/0012; B01D 21/0024; B01D 21/08; B01D 21/16; B01D 21/24; B01D 21/2444; B01D 21/30; B01D 35/02; B01D 35/26; B01D 35/30; B01D 35/306; B01D 2201/20; B01D 2201/202; B01D 2201/31; B01D 2201/30; B01D 21/10; A23L 5/23; A01G 23/10
USPC ........ 210/167.01, 167.02, 171, 172.1, 172.3, 210/194, 258, 259, 511, 513, 532.1, 533, 210/538, 540; 127/2, 9, 43, 46.1, 53; 417/228, 313; 426/655, 658, 425, 429; 47/50
See application file for complete search history.

(56) References Cited

U.S. PATENT DOCUMENTS

| | | | | |
|---|---|---|---|---|
| 2,555,607 A | * | 6/1951 | Robinson ............... | C10G 33/06 516/138 |
| 2,738,877 A | * | 3/1956 | Beach .................. | B01D 17/042 210/149 |
| 2,742,156 A | * | 4/1956 | Spangler ................ | B01D 17/10 210/115 |
| 2,972,411 A | * | 2/1961 | O'Dette ............. | B01D 17/0202 210/91 |
| 3,249,438 A | * | 5/1966 | Topol ..................... | B01D 29/92 196/46.1 |

(Continued)

*Primary Examiner* — Joseph W Drodge

(57) ABSTRACT

An oil-water separation system for separating water from the oil of a vacuum pump used in maple sap extraction and returning filtered oil to the vacuum pump, includes a vacuum pump having an oil inlet port and an oil outlet port, an oil-water separator for separating water from oil having an inlet for receiving a waste water-oil mixture from the vacuum pump oil outlet port, a first outlet for returning filtered oil to the oil inlet port of the vacuum pump and a second outlet for removing water from the system.

9 Claims, 5 Drawing Sheets

(56) References Cited

U.S. PATENT DOCUMENTS

| | | | |
|---|---|---|---|
| 3,675,395 A * | 7/1972 | Baranowski | C10M 175/00 |
| | | | 96/159 |
| 2004/0139651 A1* | 7/2004 | Harvey | A01G 23/10 |
| | | | 47/50 |
| 2010/0220564 A1* | 9/2010 | Frints | G11B 7/00736 |
| | | | 369/47.4 |
| 2018/0153195 A1* | 6/2018 | Rhodes, Jr. | F25D 31/005 |
| 2019/0371152 A1* | 12/2019 | Reilly | A01G 23/10 |

* cited by examiner

OIL-WATER SEPARATOR SYSTEM FOR VACUUM PUMPS AND METHOD EMPLOYING SAME

BACKGROUND OF THE INVENTION

1. Field of the Invention

The invention relates to the field of oil contamination in vacuum pumps. More particularly, the invention pertains to an apparatus and method that can separate oil from contaminating free, emulsified or dissolved water. More specifically, it relates to a coalescing oil and water separation system for vacuum pumps used for maple sap extraction. The system has a looped, induced flow which allows the contaminated fluid to be extracted from the oil lubrication system of the vacuum pump, and passed through a coalescing filter to remove the water from the system and allow the separated oil to be returned to the lubrication system of the vacuum pump.

2. Description of Related Art

Maple syrup is made from the xylem sap of black maple, red maple, or sugar maple trees which thrive in cold climates. The cold climate allows them to store starch in their roots and trunks. The starch is needed as it will be converted to sugar, which rises in the sap in early spring and late winter. A typical sugaring season lasts four (4) to six (6) weeks.

Traditionally, the sap is collected by tapping the tree trunks and causing the sap to flow from tapholes. Plastic tubing or pipes are used to collect the sap via gravity which flows through the tubing to a single bucket or to a storage tank for a central collection area for a stand of trees. The buckets or collection tanks are then transported to a sugar house for processing into maple syrup. However, today to speed up extraction of the maple sap, maple syrup producers now use sap puller vacuum pumps, such as those commercially manufactured and sold by Airtech Vacuum Inc of Rutherford, N.J. to induce the flow of sap and speed up the process.

However, the pumps are used under extreme conditions as they operate in an environment with low pressure and saturated water vapor, which can cause an accumulation of water droplets in the oil operated pumps. As the water contaminates the pump fluids, it forms an emulsion with the oil, dissolves inside of the oil or emerges as a free fluid which dissolves and degrades the lubricating properties of the oil. This causes deterioration of the rotating components of the pump and forms rust inside the pump. Consequently, the presence of water impacts the durability and the performance of the vacuum pump. The contaminated fluids can then interrupt or slow down the operations of the pump and, in turn, the maple sap extraction.

In the current operation of such vacuum pumps, the maintenance costs and time lost are high since there is no presently available system in the field which can be used to separate the water from the oil directly during operation of the pumps. Simply replacing the pumps would be costly and time-consuming and would further delay the sap extraction process during its critically short season.

Accordingly, it is an object of the present invention to provide a novel system and method for removing contaminated water from vacuum pumps during operation thereof in the maple sap extraction inducement process.

It is a further object of the present invention to provide such a novel apparatus and method for maple sap extraction which is relatively simple, easy and facile to use and install, and highly effective in operation, which minimizes pump maintenance, and is less costly to operate by significantly reducing, if not eliminating, down time due to oil contamination of the vacuum pumps used in maple sap extraction.

It is a more specific object of the present invention to overcome the aforementioned problems in the use of vacuum pumps for maple sap extraction by utilizing a coalescing oil-water separator to remove the accumulated water from the oil in the lubrication system of the vacuum pump and reintegrating the filtered oil back into the lubrication system of the vacuum pump via an auxiliary pump, while the wastewater is separated and discarded from the separator.

It is a more particular object of the present invention to provide a novel apparatus and method for maple sap extraction utilizing vacuum pumps wherein the contaminated water-oil mixture can be continuously removed from the oil reservoir of the vacuum pump during the entire maple sap extraction season.

SUMMARY OF THE INVENTION

Certain of the foregoing and related objects are attained according to the present invention by the provision of a water and oil separation system to remove free, emulsified or dissolved water which occurs during the operation of a vacuum pump in a saturated environment via a looped filtering system which connects to the lubricating ports of a vacuum pump operating in maple sap extraction and which removes the water that contaminates the lubricating oil. The extraction of the contaminating water is gradual and, as the water contaminants accumulate, they are drained from the system. On the other hand, the filtered oil is returned to the pump for re-use and the process cycle is continuously repeated during operation of the vacuum pump.

The apparatus comprises a coalescing filter or chamber which consists of a coalescing element inside a separator wall. Conventional coalescing filters or chambers are known by those skilled in the art for separating a water contaminated flow. Many types of coalescing separators exist and can be applied to different mixtures, for instance, water-contaminated oil (See, e.g., the filtration coalescers sold by Kaydon Custom Filtration Corp. of LaGrange Ga., USA). As the contaminated flow passes through the coalescing filter, the droplets of wastewater are separated from the oil. Due to the composition of the porous coalescing filter, the waste water separates from the oil as small droplets. As the droplets are collected, they move in a different direction than the oil. The wastewater then coalesces or accumulates to form its own mass or pool which can then be extracted separately from the oil.

According to the present invention, a forced flow of the oil with contaminating free, emulsified or dissolved water is induced by an optional auxiliary positive displacement pump downstream of the vacuum pump that continuously flows the lubricating oil fluid of the vacuum pump through the coalescing chamber. The positive displacement pump transfers the oil from the lubricating system of the vacuum pump to the filtration system by inducing a flow in between the two systems. The coalescing chamber consist of a porous tubular filter element which has a hollow, central, cylindrical channel. The fluid flows through the coalescing chamber in an inside out and bottom up direction. It goes first through the coalescing filter element to accumulate water particles together to form a mass or pool until they are large enough to separate via a perforated cylindrical outer wall or sleeve.

The coalescing elements of the chamber preferably include a tubular filter element of filter media which is soaked by the contaminated water/oil mixture. Next, the liquids pass through the separator wall which is shaped as a porous meshed support tube or sleeve with a hollow tubular cavity or chamber in which the tubular filter element is received. The size and dimensions of the separator wall are adapted to allow insertion of the required coalescing filter media within its inner tubular cavity.

The coalescing filter may be adapted to have a predetermined thickness, pore size, hydrophilic level and be of suitable dimensions to accommodate this specific sap removal application, which would be easily and readily accomplished by one skilled in the art without undue experimentation. For example, the coalescing chamber could comprise as a filtering element or media a 100 ppm (or less) water removal utilizing multi-layered fiberglass fibers in the form of tubular filter element inserted in a 200 mesh, Teflon-coated, stainless steel, tubular separator wall of the type sold by Kaydon Custom Filtration Corp. of La Grange Ga., U.S.A. used and sold for water separation from jet fuel.

As the oil-based liquid flows through the coalescing chamber, the water droplets flow uniformly from the inside face of the filter media tube ultimately to the outside separator wall passing through porous and fibrous materials which deforms and regroups them. As the water droplets regroup, they grow in larger droplets on the fibrous materials. The larger droplets continue to grow until they flow and collide with others, until they reach sufficient size or mass to overcome the viscous drag of the liquids and flow to the bottom of the unit under gravitational forces. Likewise, the separator wall collects the filtered oil on the inside of its hydrophobic-oleophilic perforated wall. The oil then re-groups sufficiently in size to flow out of the separating wall and toward the top surface of the aqueous fluid. As the wastewater accumulates and the oil separates, both can then be collected and redirected separately. The cleaned or filtered oil can be re-used by returning it via an inlet tube that connects to the inlet port of the oil lubrication system of the vacuum pump. On the other hand, a manual or automatic drain at the bottom allows the waste water to be removed from the looped oil flow.

Certain objects of the present invention are also attained by a method for separating water from the oil lubricating system of vacuum pumps. The method comprises pumping the fluid from the unit, filtering water and solid particles from the oil, and returning the oil to its original system in a loop. As the oil is contaminated by water within the lubricating system of a vacuum pump, a tube connected to an optional auxiliary pump preferably removes the oil from the unit and directs it toward the oil-water separation system. The water-contaminated oil enters from the bottom of the coalescing chamber into the central channel or cavity of the tubular coalescing element. As the process described previously is completed, and the water and oil are separated, the oil is returned to the inlet port of the lubricating system of the vacuum pump with the same induced flow from the auxiliary pump, but through a tube at the top of the separator. The large water droplets regroup at the bottom port forming a separate water pool with a higher density than the oil at the top. As the water accumulates, it can either be drained out of the system by an automatic drain valve connected to a switch floating at the aqueous top layer or it can be manually drained.

Certain of the foregoing objects are also attained by the providing of a low maintenance apparatus that can be easily interchanged and replaced in between different vacuum pumps. The coalescing chambers have a compact construction which can fit inside a transportable closed cylinder. It allows for the oil contaminated with free, emulsified or dissolved water to be separated in a circulated flow and which allows removal of large amounts of water. The coalescing chamber is durable, and it is replaceable once its life cycle is over. Likewise, the connection of the separator system to the vacuum unit is simple and can be quickly disconnected and reconnected. This allows quick maintenance and low shut down times. Moreover, due to the large oil capacity of the oil-water separator, the system reduces maintenance intervals and can be used without intervention for many months.

In a particular preferred embodiment of the invention, a system is provided wherein the process can be viewed during the operation. This is achieved by providing the coalescing chamber with a transparent cylindrical housing which allows the operator to visually track the separation of both liquids. As a result, the operator may track the accumulation of water and to ensure that the water does not overflow or return to the system. It also allows the operator to be visually alerted to any malfunctioning of the unit and prevent any unwanted occurrences in the system.

Certain of the foregoing objects and related objects are readily attained according to the present invention by the provision of a water and oil filtration system coupled to the inlet and outlet ports of the lubrication system of a vacuum pump. The installation allows for the vacuum pump's oil to move through a forced flow induced preferably with the aid of an auxiliary pump. The oil is thus moved from the oil lubrication system of the vacuum pump to the filtration system and returned to the vacuum pump via its inlet and outlet ports. The water which is separated from the mixture is collected and removed either automatically or manually.

Certain of the foregoing and related objects are also attained according to the present invention by the provision of an oil-water separation system for separating water from the oil in the lubrication system of a vacuum pump used in maple sap extraction and returning the filtered oil to the oil lubrication system of a vacuum pump, comprising an oil-water separator for separating water from oil having an inlet for receiving a waste water-oil mixture from the vacuum pump, a first outlet for returning filtered oil to the inlet port of the oil lubrication system of the vacuum pump and a second outlet for removing waste water from the system. Most advantageously, the system may include an auxiliary pump interposed between said oil-water separator and said vacuum pump having an outlet coupled to said inlet of said oil-water separator and an inlet for receiving a waste-oil mixture from the outlet port of the lubrication system of the vacuum pump.

Preferably, the system additionally including means for opening said second outlet of said oil-water separator to allow removal of the waste water from the system. Desirably, the means for opening includes a solenoid and float switch to allow removal of waste water automatically. Advantageously, said oil-water separator is a coalescing filter. Most desirably, the system additionally including a portable housing on which an optional auxiliary pump and said oil-water separator are removably mounted. Optionally, the oil-water separator has a transparent housing and the auxiliary pump is a positive displacement pump.

In a preferred embodiment of the invention, the system additionally includes a vacuum pump having a lubrication system having an inlet port and an outlet port and said inlet of said oil-water separator is coupled to said outlet port of said vacuum pump and said auxiliary pump outlet is coupled to said inlet port of said vacuum pump, whereby said vacuum pump, oil-water separator and auxiliary pump are arranged and operate in an induced flow, closed looped cycle.

Certain of the foregoing and related objects are also attained by the employment of a method for separating water from the oil of a vacuum pump used in maple sap extraction and for returning the filtered oil to the vacuum pump. The method comprising the steps of: transferring oil from the oil lubrication system of the vacuum pump during operation of the pump while it is being used for maple sap extraction to an oil-water separator; separating water from the oil of the vacuum pump in said oil-water separator to produce separate pools of waste water and filtered oil; discharging said waste water from the oil-water separator; and pumping and returning said filtered oil to the oil lubrication system of the vacuum pump preferably via an auxiliary pump. Most desirably, the method is performed continuously during operation of the vacuum pump while it is being used for maple sap extraction in a closed loop, induced flow cycle between said vacuum pump, oil-water separator and auxiliary pump.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED AND ILLUSTRATED EMBODIMENT

Figure 1:
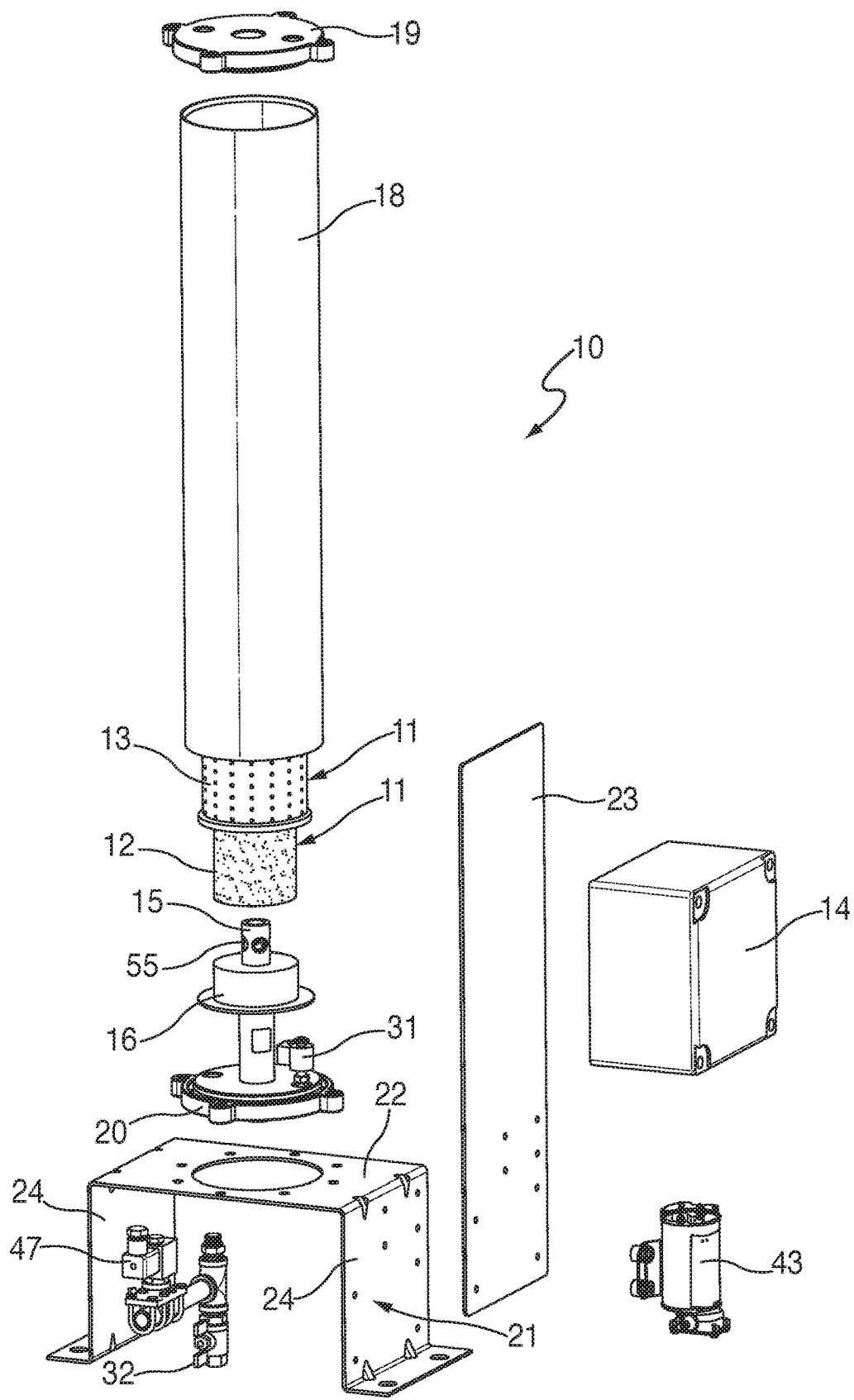
FIG. 1 is a partially exploded, top and side perspective view of an oil-water separator system embodying the present invention which illustrates the component parts thereof, apart from and without the connections to the vacuum pump.
Figure 4:
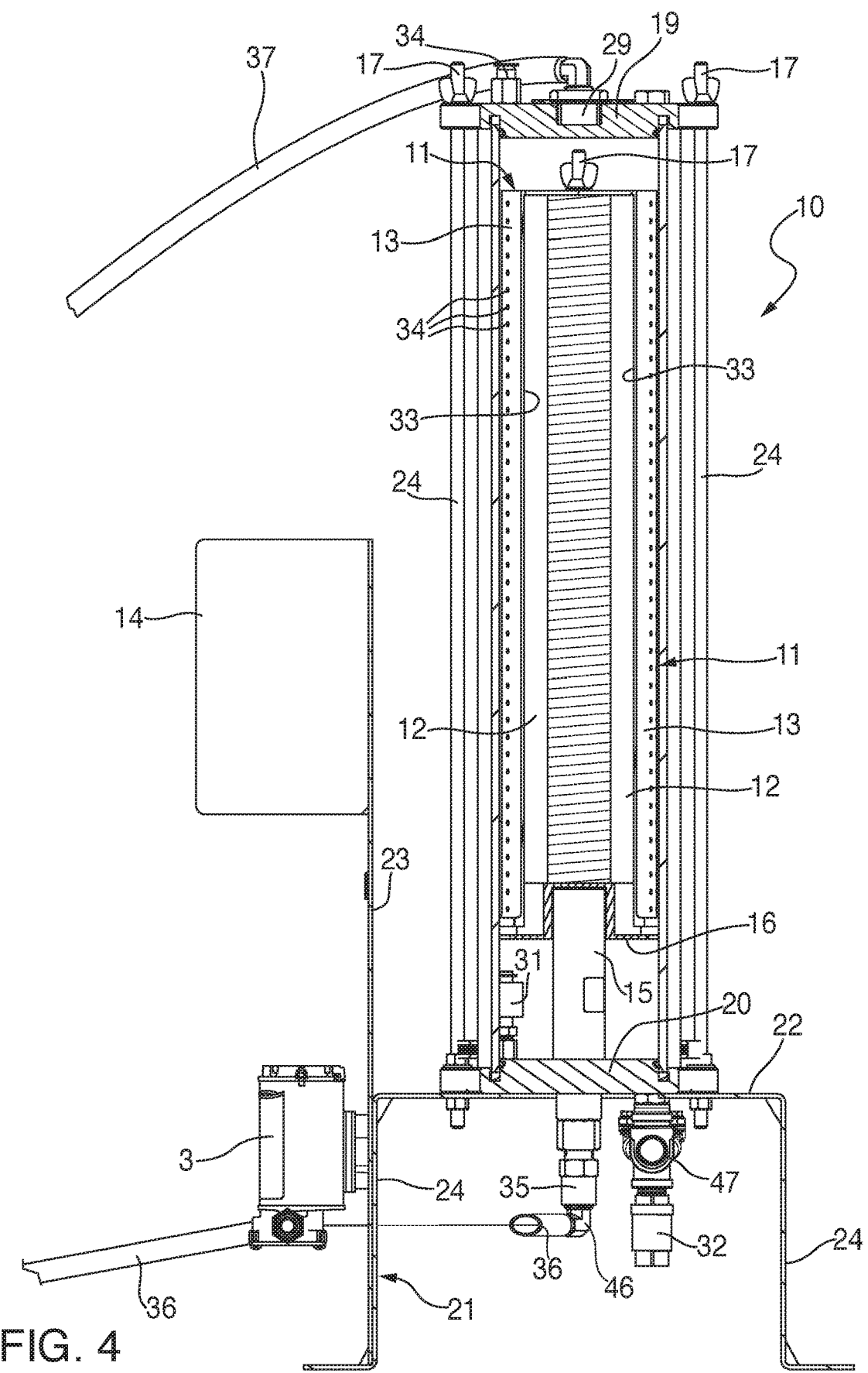
FIG. 4 is a side elevational view, in part section, of the cylindrical oil-water separator system shown in FIG. 2, further illustrating the components of the coalescing chamber.
Figure 5:
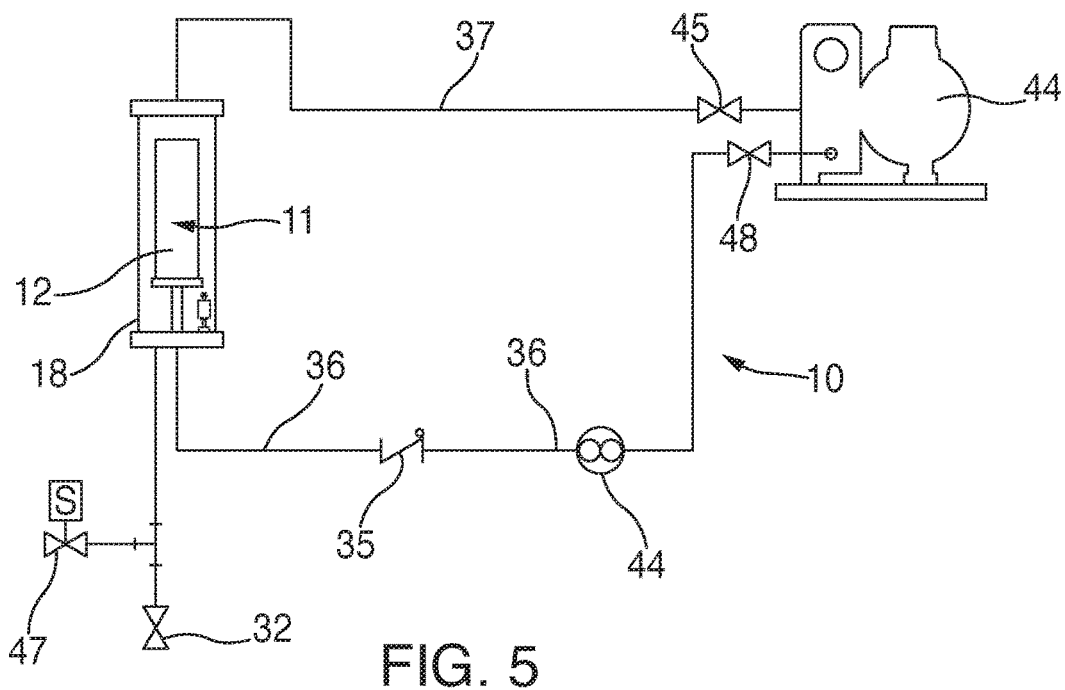
FIG. 5 is a schematically-illustrated piping diagram of the system connected to a vacuum pump.
Figure 6:
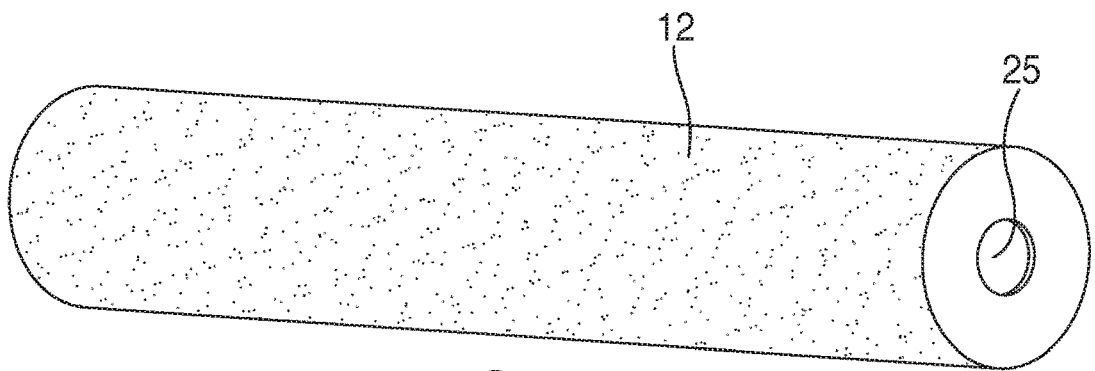
FIG. 6 is a perspective view of the coalescing cylindrical element which is received inside of the coalescing cylindrical separating wall used in the oil-water separator system.
Figure 7:
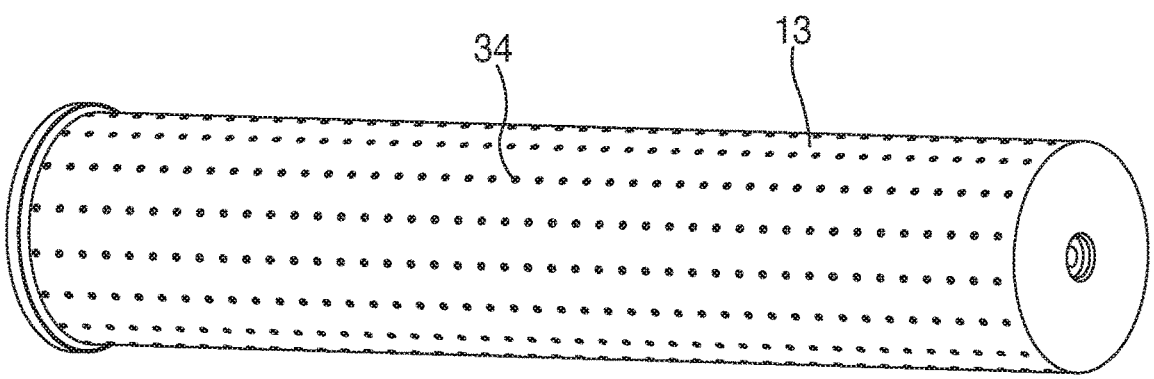
FIG. 7 is a perspective view of the coalescing cylindrical separator wall.

Turning now in detail to the drawings and, in particular, FIGS. 1-7 thereof, therein illustrated is an oil and water separator system 10 for vacuum pumps comprising a cylindrical coalescing-type filter or oil-water separator generally designated by reference numeral 11 which is preferably enclosed within a hollow, cylindrical, transparent plastic or glass housing 18. As shown in FIGS. 1, 6 and 7, filter 11 defines a coalescing chamber therein in which is mounted a tubular coalescing filter element or sleeve in the form of a perforated cylindrical, metallic or non-metallic separator wall 13 having a cylindrical chamber or cavity in which filter element 12 is received having a central cylindrical channel 25, as will be discussed in greater detail below. Coalescing filters of the type used for water separation from fuel and oil are commercially available and can be made of various sizes and materials, as previously discussed. In the hollow cylindrical channel 25 inside of the cylindrical coalescing filter 12, the water contaminated oil enters through a tube inlet 15 adjacent the bottom of the filter 11 which is also coupled to a top that-shaped bottom cover 16 that closes the coalescing chamber via its top, bottom and side walls. The transparent, hollow cylindrical tube-like housing 18 is constrained in between two disc-shaped plates, an upper plate 19 and a lower plate 20.

Figure 2:
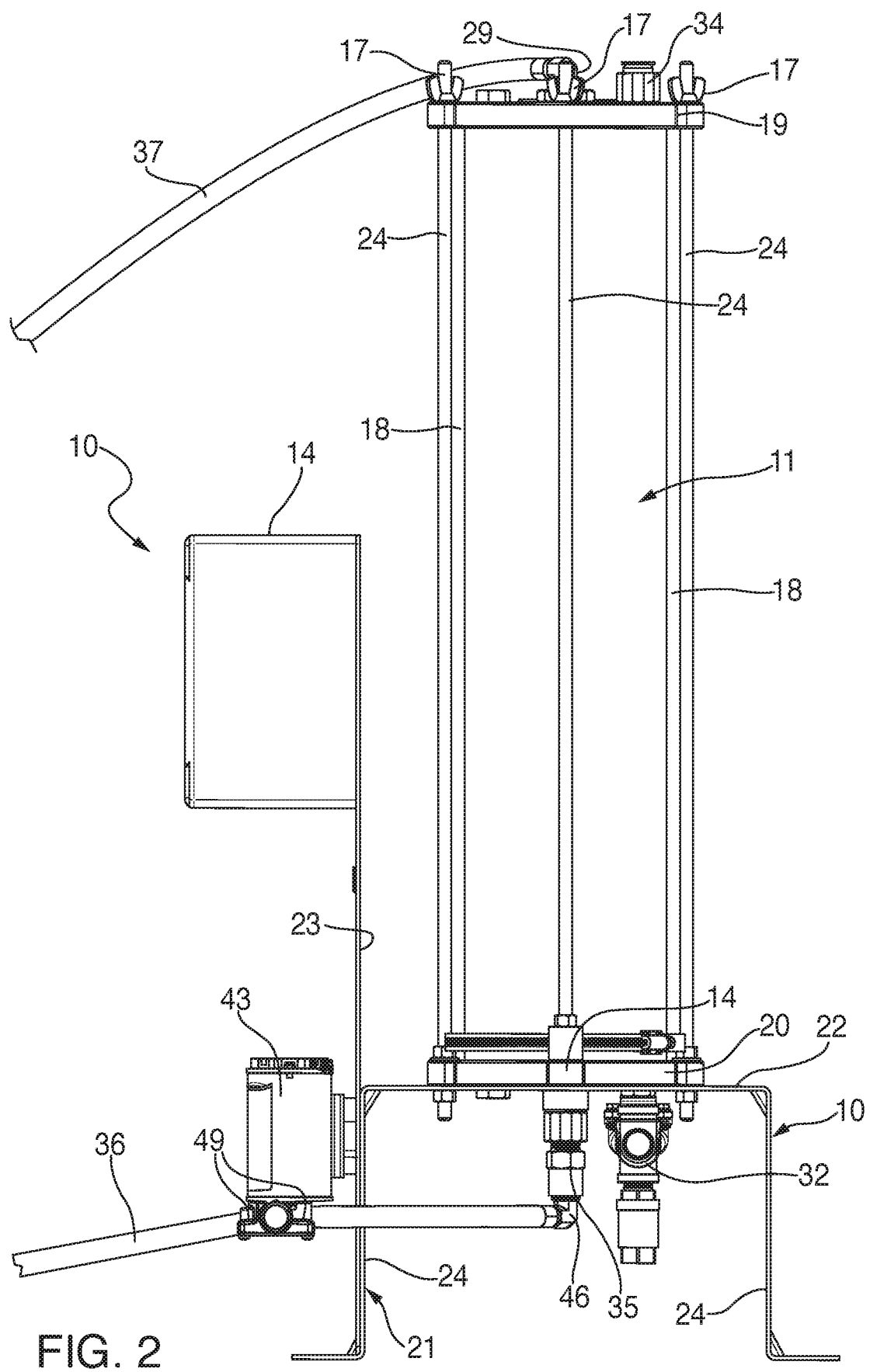
FIG. 2 is an enlarged, side elevational view of the inventive oil-water separator shown in FIG. 1, in a fully assembled state with the tubing that connects to the lubrication system of a vacuum pump.

The assembly is supported by a generally inverted, U-shaped support base 21 defining a raised horizontal wall 22 with a central opening therethrough supported by two side walls 24 and between which the piping connection and the wastewater drain 32 are installed. As seen best in FIG. 2, an optional auxiliary positive displacement pump 43 is mounted on a rectangular upright support panel 23 and one of the sidewalls 24 and, as further shown in FIG. 5, it is connected to a check valve 35 located in the portion of the inlet pipe 36 between the auxiliary positive displacement pump 43 and the inlet 15 of the system. The auxiliary pump 43 creates an induced flow, drawing the contaminated oil from the oil lubricating system of the vacuum pump 44 into filter 11 and returning filtered oil back to the vacuum pump 44. Check valve 35 is used as a protective barrier which prevents reverse flow and an accidental drainage of the oil in pump 44. As also shown in FIGS. 2 and 4, separately installed on the support base 21 is an electrical box 14 which simply serves to power the auxiliary pump 44 and the solenoid valve 35. The electrical box 14 is also attached at the top of the upright rectangular plate 23 which, in turn is affixed to one of the sidewalls 24 of the support base 21. The details of the electrical box and its contents for powering the pumps and system are well known by those skilled in the art.

FIG. 2 illustrates the oil-water separator or filter system 10 mounted on the portable platform 21 and FIG. 5 is a schematic illustration of the system's induced flow cycle between the vacuum pump 44, auxiliary pump 43, oil-water separator 10 and related piping and valves of the system. At the bottom and top of filter 11, two plastic tubes-namely inlet tube 36 and outlet tube 37 connect to the oil lubrication system or reservoir vacuum pump 44 (FIG. 5) with the inlet port or valve 45 and discharge port or valve 48 of the pump 44, respectively. The inlet tube 36 is connected directly to the auxiliary pump 43 by the means of fittings 49. From the auxiliary pump 43, the tube 36 is connected to an inlet fitting 46 which allows the contaminated liquid to enter the water-oil filter 11 via solenoid valve 35. Filter 11 is attached to the raised horizontal wall 22 of support base 21 via its lower end plate 20. Its upper endplate 19 is connected to the support base 22 via axial rods 24 distributed and spaced-apart radially about the circumference of the separator 11. The rods 24 are fixed to the support base at their lower ends and affixed to the top end plate 19 via thumb screws 17. Sandwiched therebetween is transparent cylindrical housing 18 which, upon compression and tightening of endplates 19 and 20, hermetically seals the oil-water filter 11.

Figure 3:
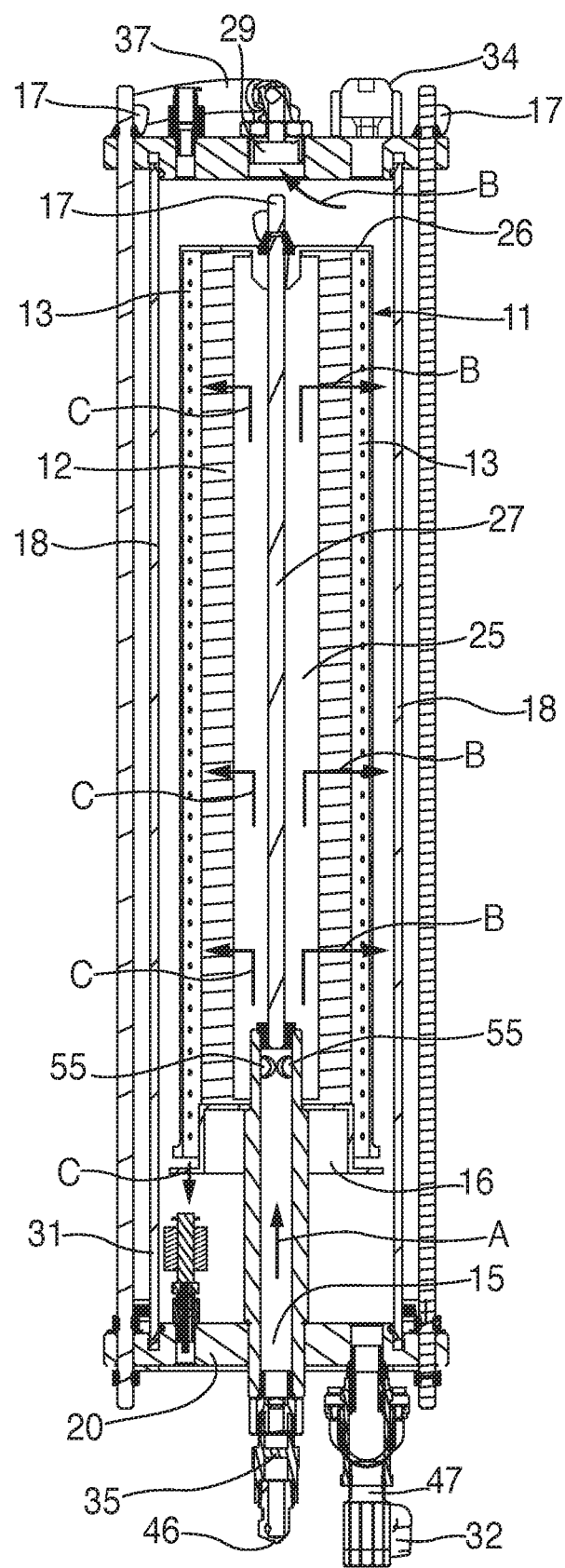
FIG. 3 is a cross-sectional view of the cylindrical oil-water separator filter assembly shown in FIG. 2, further illustrating the direction of the fluid flow.

The oil-water separation process is best explained with the aid of FIGS. 2-4. More particularly, the Arrows A, B and C in FIG. 3 shows the direction of the oil and water flow as it enters the oil-water separator from the vacuum pump 44, goes through the coalescing filter 11 and as it exits as separate oil and water streams. The combined flow of the oil-water mixture is shown by Arrow A, the flow of oil by Arrow B and the flow of water by Arrow C. For purposes of simplification and clarity, Arrow A for the water flow is shown only on the left side of the filter 11 and Arrow B is shown only on the right side of the filter 11. However, it should be realized that both the oil and water flows B and C move radially outwardly over the entire 360° circumference of filter 11.

Initially, before starting the vacuum pump unit 44, the oil-water separator 10 would be filled with non-contaminated oil which would gradually be replaced by pumped oil. Upon activation of the system, the water contaminated oil (Arrow A) enters the coalescing filter 11 through pipe 15 which is connected at its bottom inlet 35 via fitting 46 to tubing 36 from the auxiliary pump 43. As the contaminated oil enters the inlet pipe 15, it flows upwardly toward equally distanced circumferential throughholes 55 in the top end of inlet pipe 15 which open onto the hollow central cylindrical space 25 of the coalescing filter element 12. The upper end of the inlet pipe 15 is attached to the top cover 26 of the coalescing filter 11 by a central rod 27 and a thumbscrew 25. Likewise, the lower end of the inlet pipe 15 is attached to the bottom end 16 of the coalescing filter 11. As the central rod 27 is secured to both ends 16, 26, the ends 16, 26 are compressed axially via the thumbscrew 17, the coalescing filter element 12 and separator wall 13 are held in place, and the ends seal the extremities of the coalescing filter 11.

As the contaminated oil goes through the inlet pipe 15, it fills the interior cylindrical hollow channel 25 and it is drawn by the induced flow created by auxiliary pump 43 toward the adjacent cylindrical coalescing filter element 12 (Arrows B and C). As the water-contaminated oil passes through the coalescing filter element 12, small water droplets are separated from the oil. As the water droplets form and pass through the coalescing filter element 12, they re-group into larger ones at the inside surface 33 of the separator wall 13 (Arrow C). Once the water droplets attain enough mass, i.e., weight and size to counteract the viscosity of the surrounding fluid and of the filter surfaces, they systematically migrate downward due to gravity forces and as their density is higher than oil, the water mass accumulates atop the bottom endplate 20 of the system where a float switch 31 is installed (Arrow C). The switch 31 is designed to also have a higher density than oil, but to be lighter than water. Hence, it only activates once the water reaches a predetermined level. As the switch is activated, it triggers a solenoid 47 which enables an automated draining of the wastewater accumulated at on the bottom endplate 20. Alternatively, a manual drain 32 is also installed on the same endplate for removal of the water. On the other hand, the oil flows through the coalescing filter 12, passes through the pores 34 of the separator wall 13 (Arrow B) and the filtered oil droplets form a separate mass atop the separated water. At the top endplate 19, an outlet 29 returns the filtered oil (Arrow B) to the oil reservoir of vacuum pump 44 via tube 37 and inlet port or valve 45, To assist with the oil fill, a vent valve 34 is installed on this same endplate 19 and removes air pockets that might form atop of the oil.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention. For example, although the system and method are primarily intended for use with vacuum pumps used in maple sap extraction, it may be possible to use it for other comparable applications having similar conditions and environments. In addition, while it is preferred and advantageous to use an auxiliary pump, such as a positive displacement or gear pump to induce the flow, other types of pumps may possibly be used and, in fact, it may also be possible to use the vacuum pump itself to induce the flow under certain conditions or arrangements.

Accordingly, it is to be understood that the embodiments of the invention herein described are merely illustrative of the application of the principles of the invention. Reference herein to details of the illustrated embodiments is not intended to limit the scope of the claims.

We claim:

1. An oil-water separation system for use with an oil lubricating system of a rotary vacuum pump used in maple sap extraction from maple trees for separating water from oil in a waste water-oil mixture extracted from the oil lubricating system of the rotary vacuum pump, the rotary vacuum pump having an input port and an output port, which ports are connectable to the oil-water separation system for extracting the waste water-oil mixture and returning oil separated from the waste oil-water mixture to the oil lubricating system of the rotary vacuum pump, comprising:
   an oil-water separator comprising a coalescing filter for separating, with the aid of gravity, water from oil in the waste water-oil mixture, said coalescing filter having an inlet, a first outlet and a second outlet;
   wherein said coalescing filter inlet is connectable to the output port of the oil lubricating system of the rotary vacuum pump to receive the waste water-oil mixture from the oil lubricating system of the rotary vacuum pump;
   wherein said coalescing filter first outlet is connectable to said input port of the oil lubricating system of said rotary vacuum pump for returning separated oil to the oil lubricating system of the rotary vacuum pump;
   wherein said coalescing filter second outlet serves to permit discharge and removal of waste water separated from the waste water-oil mixture by said coalescing filter, and, in turn, from said oil-water separation system;
   an auxiliary pump having an auxiliary pump in jet adapted to be connectable to the oil lubricating system of the rotary vacuum pump for receiving the waste water-oil mixture and an auxiliary pump outlet adapted to be connectable to said inlet of said coalescing filter of said oil-water separator for delivering the waste water-oil mixture to said coalescing filter, and wherein said auxiliary pump is a positive displacement pressure pomp; and
   a portable housing on which said auxiliary pump and coalescing filter are mounted to assist in transport to, and operation of, said oil-wafer separation system near to a stand of maple trees.

2. The oil-water separation system according to claim 1, further comprising means for opening said second outlet of said coalescing filter to allow removal of the waste water therefrom and, in turn, from said oil-water separation system.

3. The oil-water separation system according to claim 2, wherein said means for opening includes a solenoid and float switch to allow removal of the waste water automatically.

4. The oil-water separation system according to claim 1, wherein said oil-water separator coalescing filter has a substantially cylindrical transparent housing.

5. The oil-water separation system according to claim 1, wherein said rotary vacuum pump, auxiliary pump and coalescing filter are arranged to be operable in an induced flow, closed loop cycle.

6. The oil-water separation system according to claim 1, wherein said oil-water separator additionally comprises a generally cylindrical outer housing defining an interior single cylindrical coalescing filter chamber in which is disposed said coalescing filter and a perforated separator wall disposed outwardly of said coalescing filter, and wherein said filter and said perforated separator wall are cylindrical.

7. The oil-water separation system according to claim 6, wherein said coalescing filter comprises filter media and said separator wall is hydrophobic.

8. A method for separating water from oil in a waste water-oil mixture extracted from an oil lubricating system of a rotary vacuum pump used in maple sap extraction from maple trees and for returning the separated oil to the oil lubricating system of the rotary vacuum pump used in an oil-water separation system comprising:

providing an oil-water separator comprising a coalescing filter for separating, with the aid of gravity, water from oil in the waste water-oil mixture, said coalescing filter having an inlet, a first outlet and a second outlet;

wherein said coalescing filter inlet is connectable to an outlet port of the oil lubricating system of the rotary vacuum pump to receive the waste water-oil mixture from the oil lubricating system of the rotary vacuum pump;

wherein said coalescing filter first outlet is connectable to an input port of the oil lubricating system of said rotary vacuum pump for returning separated oil to the oil lubricating system of the rotary vacuum pump; and wherein said coalescing filter second outlet serves to permit discharge and removal of waste water separated from the waste water-oil mixture by said coalescing filter and, in turn, from said oil-water separation system, said oil-water separation system further comprising:

an auxiliary pump which is a positive displacement pressure pump having an auxiliary pump inlet adapted to be connectable to the oil lubricating system of the rotary vacuum pump for receiving the waste water-oil mixture and an auxiliary pump outlet adapted to be connectable to said inlet of said coalescing filter of said oil-water separator for delivering the waste water-oil mixture to said coalescing filter, and a portable housing on which said auxiliary pump and coalescing filter are mounted to assist in transport, and operation of, said oil-water separation system near a stand of maple trees, and comprising the steps of:

moving said portable housing near to a stand of maple trees from which maple sap is to be extracted:

transferring a waste water-oil mixture from an oil lubricating system of a rotary vacuum pump while it is being used for maple sap extraction to said coalescing filter via said inlet thereof;

separating waste water from the waste water-oil mixture from said oil lubricating system of said rotary vacuum pump in said coalescing filter, with the aid of gravity, to produce separate pools of waste water and oil;

discharging said pool of waste water from said second outlet of said coalescing filter and, in turn, from said oil-water separator system; and discharging said pool of oil from said first outlet of said coalescing filter and pumping and returning said separate pool of oil to said input port of said oil lubricating system of said rotary vacuum pump.

9. The method according to claim 8, wherein said discharging of said pools of waste water and oil, pumping and returning method steps are performed continuously during operation of said rotary vacuum pump while it is being used for maple sap extraction in a closed loop, induced flow cycle between said rotary vacuum pump, coalescing filter and auxiliary pump.

* * * * *